US012745687B2

(12) United States Patent
Braun et al.

(10) Patent No.: US 12,745,687 B2
(45) Date of Patent: Sep. 29, 2026

(54) COMMUNICATION SYSTEM FOR AGRICULTURAL MACHINE AND METHOD OF MANUFACTURING AN AGRICULTURAL MACHINE

(71) Applicant: HORSCH Maschinen SE & Co. KG., Schwandorf (DE)

(72) Inventors: Michael Johann Braun, Schwandorf (DE); Matthias Ferstl, Schwandorf (DE); David Meier, Schwandorf (DE); Christian Kagerer, Schwandorf (DE)

(73) Assignee: HORSCH Maschinen SE & Co. KG., Schwandorf (DE)

( * ) Notice: Subject to any disclaimer, the term of this patent is extended or adjusted under 35 U.S.C. 154(b) by 501 days.

(21) Appl. No.: 18/258,008

(22) PCT Filed: Dec. 17, 2021

(86) PCT No.: PCT/EP2021/086375

§ 371 (c)(1),
(2) Date: Jun. 16, 2023

(87) PCT Pub. No.: WO2022/129455

PCT Pub. Date: Jun. 23, 2022

(65) Prior Publication Data

US 2024/0049617 A1 Feb. 15, 2024

(30) Foreign Application Priority Data

Dec. 18, 2020 (DE) ........................ 102020134176.8

(51) Int. Cl.
*A01B 69/04* (2006.01)
*H04L 12/40* (2006.01)

(52) U.S. Cl.
CPC ............ *A01B 69/008* (2013.01); *H04L 12/40* (2013.01); *H04L 2012/40273* (2013.01)

(58) Field of Classification Search
CPC .................. A01B 69/008; H04L 12/40; H04L 2012/40273
See application file for complete search history.

(56) References Cited

U.S. PATENT DOCUMENTS 11,715,338 B2 * 8/2023 Vejalla .................... G06N 3/08 701/31.4
11,981,273 B2 * 5/2024 Loibl ................. B60R 16/0231
(Continued)

FOREIGN PATENT DOCUMENTS

CN 205281258 U * 6/2016
CN 108170084 A * 6/2018 ............... G06F 8/70
(Continued)

*Primary Examiner* — Scott A Browne
(74) *Attorney, Agent, or Firm* — AVEK IP, LLC; Kent R. Erickson

(57) ABSTRACT

The invention relates to a communication system for an agricultural machine and an agricultural machine comprising such a communication system. The invention further relates to a method of manufacturing such an agricultural machine.
The communication system for an agricultural machine comprises a main control device, which is configured as a central computing and control unit for controlling machine functions, preferably such as the positionally accurate switching on and off of distribution and/or processing processes; and at least one auxiliary operating component which is configured to perform an operating function assigned to it as a function of control data from the main control device and/or independently. The main control device and the at least one auxiliary operating component each have at least one Ethernet interface for connection to an Ethernet data network, for sending and/or receiving data via the Ethernet data network during the control of machine functions.

28 Claims, 3 Drawing Sheets

(56) References Cited

U.S. PATENT DOCUMENTS

| | | | | |
|---|---|---|---|---|
| 2013/0167227 | A1* | 6/2013 | Miura | B66C 17/18<br>726/19 |
| 2014/0019797 | A1 | 1/2014 | Macdonald | |
| 2020/0146207 | A1* | 5/2020 | Long | A01B 63/111 |
| 2020/0294401 | A1* | 9/2020 | Kerecsen | G08G 1/205 |
| 2020/0352083 | A1* | 11/2020 | Ramachandran | A01B 69/008 |
| 2022/0117209 | A1* | 4/2022 | Sibley | G05D 1/0274 |
| 2022/0142142 | A1* | 5/2022 | Van Alphen | A01M 7/0089 |
| 2024/0253163 | A1* | 8/2024 | Sibley | A01C 23/047 |

FOREIGN PATENT DOCUMENTS

| | | | | |
|---|---|---|---|---|
| CN | 109906587 | A * | 6/2019 | H04W 92/02 |
| DE | 102007056318 | A1 | 10/2008 | |
| DE | 102015111911 | A1 | 1/2017 | |
| DE | 102018111767 | A1 | 5/2019 | |
| DE | 102018203235 | A1 | 9/2019 | |
| DE | 102018209833 | A1 | 3/2022 | |

* cited by examiner

31

COMMUNICATION SYSTEM FOR AGRICULTURAL MACHINE AND METHOD OF MANUFACTURING AN AGRICULTURAL MACHINE

CROSS-REFERENCE TO RELATED APPLICATION

This application claims priority from German patent application No. DE 10 2020 134 176.8 filed Dec. 18, 2020, the disclosure of which is hereby incorporated herein in its entirety by reference.

FIELD OF THE INVENTION

The invention relates to a communication system for an agricultural machine and to an agricultural machine having such a communication system. The invention further relates to a manufacturing method of such an agricultural machine.

BACKGROUND

Current communication systems used in agricultural machines usually have several job computers (computer units) with a master and one or more slaves, wherein each job computer also has I/Os, i.e. input/output interfaces for the corresponding sensors, actuators, etc. In order for the various job computers to coordinate their operations, synchronize, and exchange necessary data among each other, they communicate via a CAN bus. A special standard, the ISOBUS, was developed for the communication of the agricultural machine with a tractor or with a standardized man-machine interface. The man-machine interface in the ISOBUS standard is called Virtual Terminal (VT) or Universal Terminal (UT). ISOBUS is the common name for agricultural data bus applications that conform to the ISO 11783 standard. This standard defines firstly the physical characteristics, such as plugs and cables, secondly the type of participants and thirdly the data formats and interfaces of the network. The protocols SAE J1939 and NMEA-2000 form the basis. Typical data transmission rates are 250 kBit/s, whereas with a CAN data bus the transmission rates are 125 kBit/s to 1000 kBit/s.

However, modern agricultural machines have increasingly higher demands on their functionality and thus their control systems and the communication systems used. Increasingly complex software is used on the part of the agricultural machine, which must be regularly updated, e.g. by providing new functionalities (features). However, software updates of the known control units (job computers), which usually have to be flashed for this purpose, are time-consuming and error-prone. Furthermore, the use of telemetry applications, e.g. the real-time transmission of application maps, requires the transmission and storage of large amounts of data, for which the ISOBUS systems commonly used to date are increasingly reaching their limits. Due to the increasing complexity of sensor technology and control procedures, increasingly large amounts of data must be transmitted via the data bus, for which the data transmission rates that can be realized with the CAN data bus or ISOBUS are not sufficient.

It is therefore a task of the invention to provide an improved communication system for an agricultural machine that overcomes the aforementioned problems. In particular, a simplified architecture and/or a communication system with a higher bandwidth is to be provided.

SUMMARY

A first general aspect of the invention relates to a communication system for an agricultural machine (farm machine). The communication system comprises a main control device which is configured as a central computing and control unit for controlling machine functions of the agricultural machine. Such machine functions can be, for example, the positionally accurate (position-precise) switching on and off and control of agricultural distribution and/or processing processes. The main control device has at least one Ethernet interface for connection to an Ethernet data network. An Ethernet data network is a technology known per se that specifies software (protocols, etc.) and hardware (cables, distributors, network cards, etc.) for wired data networks. The Ethernet interface can be used to send and/or receive data over the Ethernet data network in a machine function control.

The communication system further comprises at least one auxiliary operating component which is configured to perform an operating function of the agricultural machine assigned to it. The operating function assigned to an auxiliary operating component preferably covers only a part of the overall operating functions of the agricultural machine, while the main control device serves as a higher-level control device for controlling and/or regulating the operating functions. The auxiliary operating component may be configured to perform the assigned operating function independently and/or in dependence on control data from the main control device. In other words, the auxiliary operation component may both independently perform tasks and functions and/or be directly controlled by the main control device and/or provide its resources and functionality to the main control device. The at least one auxiliary operating component has at least one Ethernet interface for connection to the Ethernet data network, which in turn can be used to send and/or receive data over an Ethernet data network in a control of machine functions.

A particular advantage of the communication system according to the invention is thus that Ethernet-based communication for controlling machine functions of the agricultural machine is made possible, which is far superior to CAN data bus or ISOBUS-based communication systems with regard to the realizable data rates. This enables agricultural machine functions that require fast processing of large amounts of data. Another advantage is that, due to the fast Ethernet-based communication, a large part of the control logic for carrying out the agricultural work processes, such as an application and distribution of liquid or solid active substances or of seeds or carrying out a soil cultivation, can be centralized in one control device, which is referred to here as the main control device. The main control device can conveniently control one or more of the auxiliary operation components via the Ethernet data network. The auxiliary operating components can thus be configured as more efficient network nodes or control devices compared to the job computers arranged in a distributed manner in a usual ISOBUS-based communication system.

In a preferred embodiment, the communication system further comprises an Ethernet data network. Accordingly, the main control device and the at least one auxiliary operating component may be in communication via the Ethernet data network.

Alternatively, however, an embodiment of a communication system without an Ethernet data network is conceivable. Instead, the communication system could have a CAN, ISOBUS and/or a Local Interconnect Network, LIN, data bus via which the main control device and the at least one auxiliary operation component are in communication. In this embodiment, the main control device and the at least one auxiliary operating component each have, in addition to the Ethernet interface, at least one of the following data communication interfaces: a CAN interface for connection to a CAN data bus, an ISOBUS interface for connection to an ISOBUS data bus and a LIN interface for connection to a LIN bus (hereinafter referred to as CAN, ISOBUS and/or a LIN interface for short).

In this embodiment, the main control device and the at least one auxiliary operating component are technically capable of Ethernet-based communication in principle, but the function is not (yet) actually used. Such an embodiment is conceivable and useful for embodiments of a communication system at the beginning of the introduction of a new Ethernet-based system architecture, e.g. if not all or hardly any auxiliary operation components, e.g. from third-party suppliers, have been converted to Ethernet-based, so that communication is still carried out via e.g. a CAN data bus for the time being. This facilitates a future changeover to Ethernet-based communication.

If this document refers to control or control device, it should also include regulation and a regulating device, including the aspect of closed-loop feedback control. The main control device can be configured to control working units of the respective agricultural machine, for example by processing corresponding control or regulating programs and algorithms or also by collecting operating parameters and/or field cultivation parameters and, if necessary, processing and evaluating them. The main control device may further be configured to control one or more of the auxiliary operation components and/or the second auxiliary operation components, which are described below, e.g. by sending data for controlling the respective auxiliary operation components to the auxiliary operation components and/or the second auxiliary operation components via the Ethernet data network and/or another data bus. The main control device can also be configured to centrally combine the increasingly large quantities of process and status data of work processes of the agricultural machine for documentation and analysis purposes, e.g. in order to transmit them to an external server. The main control device can also serve as the central communication server of the communication system. The main control device can also be configured to provide telemetry, telematics and/or diagnostic functionality of the agricultural machine.

In an advantageous embodiment, the main control device can have a data communication interface that is a CAN interface, preferably a CAN interface according to the CAN 2.0A, CAN 2.0B, or CAN-FD standard. This offers the advantage that the main control device can also communicate with devices that are (only) CAN data bus compatible, for example, or existing control devices or job computers, whose functionality can continue to be used in this way. Furthermore, the main control device can have a data communication interface that is an ISOBUS interface or a high-speed ISOBUS interface. This offers the advantage that the main control device can also communicate with devices that are (only) ISOBUS-compatible, e.g. with an operator terminal (VT).

Alternatively or additionally, the main control device may have a data communication interface that is a Local Interconnect Network, LIN, bus interface. Accordingly, devices equipped with a LIN bus interface can be integrated.

Accordingly, the communication system can have a CAN-BUS, ISOBUS and/or LIN bus data network. Wired auxiliary operating components can be connected by means of CAN, ISOBUS or LIN interfaces. The main control device can thus centrally control the communication with different data networks and network components according to the aforementioned embodiments.

According to a further aspect, the Ethernet interfaces of the main control device and/or of auxiliary operation components of the communication system may be high-speed ISOBUS interfaces. According to a further aspect, the Ethernet data network may be an Ethernet data network implementation according to 100BASE-TX, 1000BASE-T, 100BASE-T1 or 1000BASE-T1.

In a further advantageous embodiment, the communication system may further comprise a mobile radio interface and/or at least one wireless short-range connection interface, for example a WLAN or a Bluetooth interface. Wireless auxiliary operating components can be connected via this. Likewise, software updates can be transmitted via these wireless interfaces. These further wireless interfaces can be integrated into the main control device, which enables a particularly compact design. Alternatively or additionally, the mobile radio interface and/or at least one short-range wireless interface may be provided by one of the at least one auxiliary operation component. For example, an auxiliary operation component may be provided whose task is to provide the wireless interfaces of the communication system for external wireless communication. This auxiliary operation component may, for example, be wired to the main control device for communication. This embodiment offers the advantage that the wireless communication functionality can be encapsulated in a dedicated network component, which is advantageous from a developmental point of view with regard to the rapidly changing communication standard.

The mobile radio interface may be an interface implemented according to a Third Generation Partnership Project (3GPP) standard, e.g. 3GPP 3G, 3GPP LTE, 3GPP 4G, 3GPP 5G New Radio or a successor thereof. The WLAN interface may be implemented according to a WLAN standard of the IEEE 802.11 family of standards.

In another advantageous embodiment, Unix or a Unix derivative, preferably Linux, is installed as the operating system on the main control device. By using Unix or a Unix derivative, a larger selection of available program libraries can be accessed than in classical control unit development, which enables faster and more agile adaptations.

In another particularly preferred embodiment, the main control device is programmed to use several processor cores. The main control device can thus have one multi-core processor (multi-core CPU) or several multi-core processors (multi-core CPUs) on the hardware side. The main control device can be programmatically set up to divide its control tasks into several subtasks, which are correspondingly assigned to different processor cores for processing. This embodiment thus enables a particularly high-performance execution of complex agricultural work processes, for example those in which image data of the soil area to be worked and/or the crop are generated during operation by means of cameras, which are evaluated quasi in real-time in order to control work processes of the agricultural machine depending on the evaluation.

In an advantageous embodiment thereof, the main control device for using the multiple processor cores may have a first application kernel that is configured to control the machine functions. The first application kernel thus bundles functionality of the main control device, which is assigned on the hardware side to a separate processor core for processing.

The main control device may further comprise a plurality of application kernels of different types, such as application kernels and real-time kernels, for utilizing the plurality of processor cores. For example, the main control device may comprise at least one of the following additional application kernels to utilize the plurality of processor cores: a second application kernel, a security kernel, and a real-time kernel.

An application kernel, e.g. first application kernel, second application kernel, safety kernel, real-time kernel, is understood here as a functionality of the agricultural machine encapsulated in the main control device in terms of programming or software, which is assigned on the hardware side to a separate core of the multiprocessor core or a separate processor (CPU) for processing.

The second application kernel can provide a specific sub-functionality of the agricultural machine. For example, the second application kernel can provide a telematics and/or diagnostic functionality of the agricultural machine. Alternatively or additionally, the second application kernel can be configured to perform processing of camera data of the agricultural machine. This can improve the performance of the communication system.

The safety kernel can be configured to override the control of the agricultural machine and/or at least one actuator of the agricultural machine, which executes a safety-relevant movement in terms of functional safety, by the first application kernel in the presence of a safety-critical situation and to transfer the agricultural machine and/or the at least one actuator into a safe operating state in terms of functional safety.

It is known from practice that the development of control systems, for example for electrically or hydraulically operated actuators, must generally be carried out under the aspect of functional safety. For this purpose, standards are known that define the requirements for this functional safety, for example the IEC 61508 standard. Agricultural machinery is covered by the EN ISO 13849 and ISO 25119 standards. The implementation of these standards requires a great deal of administration and documentation.

The assignment of safety-critical situations in terms of functional safety to a separate safety kernel offers two advantages. Firstly, administration and documentation efforts can be reduced, because these are only incurred by separating or encapsulating the functionality in the form of a safety kernel if changes are required to the safety kernel, but not to the other kernels. Secondly, it can be ensured that safety-critical functions are executed reliably and quickly and are not affected by other control functions when they compete for hardware resources at the same time. This is ensured with a dedicated hardware resource in the form of a dedicated processor core or even a dedicated processor that performs the functionality of the safety kernel on the hardware side.

The real-time kernel can be configured to control selected machine functions of the agricultural machine in real-time or substantially without latency. In this case, the real-time kernel can be executed on its own core of a multi-core processor. Alternatively, the real-time kernel can be implemented on a separate processor, for example using a real-time operating system or without an operating system by means of so-called bare-metal programming.

In a particularly advantageous embodiment, the safety kernel is implemented as a real-time kernel. This enables real-time execution of safety functions.

According to a further embodiment, the main control device is configured to perform a software update of an auxiliary operating component at a predefinable time and, in doing so, to transmit the software to be updated from the main control device to the auxiliary operating component via the Ethernet data network. The Ethernet data network enables high-speed data transmission for this purpose, so that time-consuming and error-prone flashing of the control units can be avoided. A further embodiment of this provides that the main control device receives the software update via a wireless interface, e.g. a mobile radio interface or a WLAN interface, i.e. receives it “over-the-air”, and then transmits it via the Ethernet data network to one or more of the auxiliary operating components. In this way, for example, a manufacturer of agricultural machinery can provide software updates centrally.

By using high-performance interfaces for high-speed data transmission, cryptographic procedures can also be practicably used in the system to secure communication and protect safety-critical functions from unauthorized use, e.g. with the help of digital certificates. Accordingly, the communication system can be configured to encrypt communication via the Ethernet interfaces and/or to secure access to the communication system with the help of digital certificates.

According to another embodiment, the main control device is configured to centrally access all data communication interfaces in the communication system for tracing and/or logging and to make the data collected via these interfaces available for diagnostic purposes. This can increase safety and improve diagnostic possibilities.

According to a further embodiment, the at least one auxiliary operation component has an auxiliary operation component that is configured as an input and output module, each having at least one input connection for connecting a sensor and at least one output connection for connecting an actuator. The auxiliary operation component thus represents a so-called I/O module that has one or more different communication interfaces. Furthermore, an I/O module may have analogue and digital inputs and outputs, in addition to the Ethernet interface, for the connection of sensors and actuators, etc.

In this respect, an embodiment in which all sensors and actuators of the agricultural machine are in communication with the main control device via one or more auxiliary operating components configured as input and output modules is advantageous. According to another aspect, the main control device may have no analog inputs and no analog outputs.

According to a further aspect, the main control device may be in communication only indirectly with sensors and actuators of the agricultural machine, preferably via one or more auxiliary operating components configured as input and output modules.

According to a further aspect, controlling an actuator and/or reading sensor data from a sensor of the agricultural machine can be performed exclusively by one or more auxiliary operating components configured as input and output modules, which are configured to perform the controlling and/or reading independently or in dependence on control commands generated by the main control device.

It is thus possible that the main control device does not have any inputs and outputs for the direct connection of actuators and sensors, but functions as a separate computing unit and only has data interfaces for communication with the auxiliary operating components. Execution activities such as controlling and regulating actuators or reading back sensors are then carried out by the auxiliary components to which these actuators and sensors are connected. These can act as so-called slaves, which are controlled accordingly by the main control device acting as master. By means of the above-mentioned aspects, a more modular and scalable system architecture of the communication system can be achieved.

In one embodiment, the main control device may have no analog inputs and no analogue outputs.

According to a further embodiment, the at least one auxiliary operating component comprises an auxiliary operating component coupled to the main control device according to the master-slave principle, such that the auxiliary operating component is configured to send data on its operating state to the main control device and to receive control signals from the main control device. All auxiliary operating components can be coupled to the main control device according to the master-slave principle.

According to a further embodiment, the at least one auxiliary operating component comprises an auxiliary operating component which is configured to perform a safety function in terms of functional safety and/or, in the event of a safety-critical situation, to transfer, as part of a priority control mechanism, the control of the agricultural machine or of at least one actuator of the agricultural machine, which executes a safety-relevant movement in terms of functional safety, to a safe operating state in terms of functional safety. This can reduce administration and documentation costs, as such costs, since, by encapsulating the functionality in the form of a separate auxiliary operating component, these costs only incur if changes are required to this auxiliary operating component, but not to the other auxiliary operating components or the main control device if these do not implement safety functions in the sense of functional safety.

According to a further embodiment, the communication system may comprise a network distributor of the Ethernet data network formed by an auxiliary operating component. This offers the advantage that the number of network nodes can be increased, as this is not limited by the number of Ethernet interfaces provided on the device side of the main control device. Alternatively or additionally, a network distributor of the Ethernet data network may be integrated into the main control device, or the network distributor or a network switch function may be integrated into one or more of the auxiliary operation components as an additional function.

According to a further embodiment, the at least one auxiliary operating component comprises an auxiliary operating component that is only indirectly in communication with the main control device via the Ethernet data network via at least one further auxiliary operating component. This can reduce the complexity of the communication system, in particular if an auxiliary operating component is only controlled by a further auxiliary operating component.

According to a further embodiment, the at least one auxiliary operation component has an auxiliary operation component that has at least one of the following data communication interfaces: a CAN interface, an ISOBUS interface, and a LIN interface. This offers the advantage that the auxiliary operation component may selectively connected via Ethernet or via another data interface in terms of communication technology, which facilitates the integration of so-called existing components (legacy components), e.g. based on ISOBUS. Another advantage is that one or more auxiliary operation components that do not have an Ethernet interface can be connected to such an auxiliary operation component. These auxiliary operation components that do not comprise an Ethernet interface are referred to in this document as second auxiliary operation components to better distinguish them from auxiliary operation components with Ethernet interfaces.

Accordingly, the communication system may further comprise at least a second auxiliary operating component that does not comprise an Ethernet interface but instead comprises at least one of the following data communication interfaces: a CAN data bus interface, an ISOBUS interface and a LIN interface.

Such second auxiliary operating components can be directly connected to the main operating component via a CAN data bus, ISOBUS and/or LIN bus. Alternatively, such second auxiliary operating components can be in communication connection with an auxiliary operating component which has an Ethernet interface and at least one CAN, ISOBUS or LIN interface, which in turn is in communication connection with the main control device via its Ethernet interface. According to this embodiment, the second auxiliary operating component is thus only indirectly in communication with the main control device.

In this way, “legacy” components, i.e. components that do not have an Ethernet interface, can be advantageously integrated into the communication system.

According to a further embodiment, the communication system is adapted to receive position information from a position determination device, preferably a GNSS (global navigation satellite system) position determination device, wherein the position determination device is adapted to determine a current position of the agricultural machine. The position determining device may comprise one or more GNSS antennas, preferably GPS antennas. Here it is possible that the main control device and/or one or more of the auxiliary operating components are functionally coupled to the position determining device, i.e. are or can be brought into signal connection with it, so that position information (position signals) can be transmitted from the position determining device to the main control device and/or to the corresponding auxiliary operating components.

Here, it is further possible that the main control device is configured to control a switching on and off of distribution and/or processing processes depending on the received position information. Alternatively or additionally, the at least one auxiliary operating component may have one (or more) auxiliary operating component(s) that is configured to control a switching on and off of distribution and/or processing processes as a function of the received position information. The switching on and off is preferably a position-precise switching on and off.

Alternatively or additionally, the main control device and/or one or more of the auxiliary operating components can be configured to control a manual switching on and off of distribution and/or processing processes as a function of a user input and can be and/or be brought into signal connection with an input device for capturing the user input.

A reaction time for the respective signal transmission for controlling the switching on and off of distribution and/or processing processes, as described above, can be significantly accelerated by the Ethernet-based communication of the communication system.

The components of the agricultural machine that are switched on and off may be spray nozzles, metering devices and/or the like. According to this aspect, the main control device and/or the auxiliary operation component for controlling the switching on and off of distribution and/or processing processes can be configured to control spray nozzles for the application of a liquid active substance and/or metering devices for the application of a granular distribution material.

According to another embodiment, the communication system may comprise an artificial intelligence module, AI module, also referred to as an AI device. For example, the AI module may be part of the main control device. In particular, the AI module can be set up to process, in particular evaluate, data from cameras (e.g. plant detection, person recognition, etc.) or other sensors for environment monitoring, whereby the AI module uses machine learning methods for this purpose, preferably by means of an artificial neural network.

According to a further embodiment, the communication system may further comprise a monitoring module which is part of the main control device or is in signal connection therewith and is configured to receive environment data from at least one camera for environment detection and/or from environment sensors and to process it for environment monitoring.

In an advantageous embodiment thereof, the monitoring module is configured as an artificial intelligence module, AI module, which evaluates the environment data for environment monitoring by means of machine learning methods, preferably by means of an artificial neural network. For example, the monitoring module can receive image data from a camera arranged on the agricultural machine for environment detection and the selection device can be configured to receive a digital image captured by the camera and evaluate it by means of AI-based image recognition in order to detect obstacles, rows of plants, tracks and/or other objects that are important for agricultural soil or plant treatment.

Such AI techniques and algorithms for AI-based object recognition using image data are also well known in the prior art. As training data, for example, data can be used that are generated by the agricultural machine during test passes of agricultural areas by the camera, and in which the objects to be recognized by means of AI-based object recognition are classified manually in each case in order to train the AI module.

A second general aspect of the invention relates to an agricultural machine comprising a communication system as described herein. The agricultural machine may be an agricultural machine for agricultural soil or crop treatment, for example an agricultural spreading machine such as a field sprayer, a pneumatic fertilizer spreader or a seeder. The agricultural machine may further be an agricultural soil treatment machine.

The agricultural machine for agricultural soil or crop treatment may be configured as a trailed implement.

The agricultural machine may further be an agricultural vehicle combination comprising a towing vehicle, which is a tractor, and a trailed implement. Here, the towing vehicle may have a different communication system from the trailed implement, for example, in one embodiment, only the trailed implement may have a communication system as described in this document. In other words, in one embodiment, the communication system according to the invention may be implemented exclusively in the trailed implement, for example a towed spreader.

According to a further embodiment, the agricultural utility vehicle combination can have an autonomous towing vehicle and a trailed implement for agricultural soil or plant treatment. By means of the autonomous towing vehicle, autonomous navigation of the utility vehicle combination on an agricultural area can be realized.

In this regard, the agricultural utility vehicle combination may comprise a communication system as described herein, wherein the main control device of the communication system is arranged exclusively on the towing vehicle or on the trailed implement and the at least one auxiliary operating component may comprise auxiliary operating components arranged on the towing vehicle and auxiliary operating components arranged on the trailed implement.

Alternatively, the agricultural vehicle combination can have two communication systems according to the invention, whereby a first communication system is spatially and functionally assigned to the towing vehicle and a second communication system is spatially and functionally assigned to the trailed implement.

In further embodiments, the agricultural utility vehicle combination comprising an autonomous towing vehicle may comprise at least one of the following further optional aspects:

The utility vehicle combination may comprise an articulated joint connecting the towing vehicle to the implement; a steering actuator device by means of which a position of the articulated joint is adjustable for steering the utility vehicle combination; a position determining device, preferably GNSS position determining device, wherein the position determining device is configured to determine a current position of the utility vehicle combination; and a control unit configured to operate the steering actuator device in dependence on a predetermined travel route line and the determined current position.

Preferably, the predefined route line can have several parallel lanes to be travelled along one after the other, whereby at least two adjacent lanes are connected to each other at the ends by means of a headland. The tracks can be at least partially straight and/or at least partially curved.

The implement can be moved between a working position and a transport position. In the transport position, the implement can protrude over the joint in the direction opposite to the forward direction of travel of the utility vehicle combination. Preferably, in the transport position, the implement also projects over the steering actuator device and/or the tractor in the direction opposite to the forward direction of travel. Advantageously, by utilizing a space above the articulation for a section of the implement, the agricultural utility vehicle combination can enable a particularly compact transport position of the vehicle combination, with which the vehicle combination can be moved, for example, over public roads. The utilization of the space above the joint can also enable the implement to have a large working width in the working position and/or a construction that enables the implement to be converted between the working position and the transport position can be constructed comparatively simply, since, for example, fewer movable segments have to be provided. These advantages can be further enhanced by utilizing a space above the steering actuator device and the tractor by the section of the implement in the transport position.

The realization of the main control device according to the invention as a central control unit with Ethernet interface offers the possibility of transferring the respective machine configuration of the agricultural machine manufactured in the course of a manufacturing process to the main control device by means of, for example, an interface from an ERP system or by means of a computer unit of a production line, e.g. belt end tool.

Accordingly, a third general aspect of the invention relates to a method of manufacturing an agricultural machine as described in this document. The method comprises the following steps:

Manufacturing an agricultural machine with a specific machine configuration, wherein control software stored in an ERP system or a computer of a production line for manufacturing the agricultural machine is selected and/or parameterized for controlling the agricultural machine as a function of the specific machine configuration and is transferred from the ERP system or the computer of the production line to the main control device.

In this way, the software required to operate the agricultural machine can be quickly and easily transferred to the corresponding hardware as part of the manufacturing process.

BRIEF DESCRIPTION OF THE DRAWINGS

The preferred embodiments and features of the invention described above can be combined with each other as desired. Further details and advantages of the invention are described below with reference to the accompanying drawings. The following is shown.

DETAILED DESCRIPTION OF THE INVENTION

Identical or functionally equivalent elements are designated with the same reference signs in all figures and are not described separately in some cases.

Figure 1:
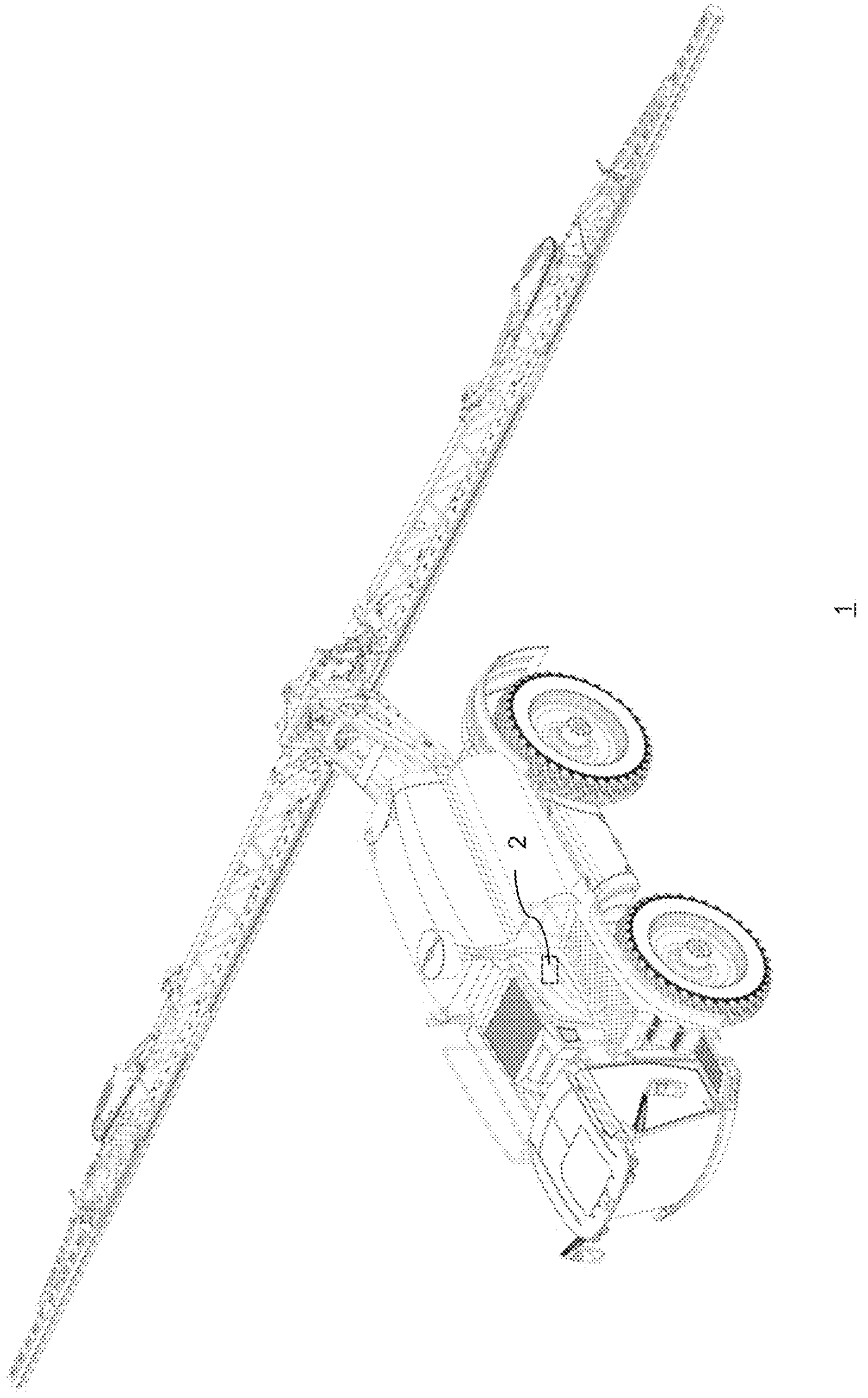
FIG. 1A perspective view of an agricultural machine with a communication system according to an embodiment of the invention.

FIG. 1 shows a perspective view of an agricultural machine with a communication system 2 according to an embodiment of the invention. The agricultural machine, by way of example only, is a self-propelled agricultural field sprayer.

Figure 2:
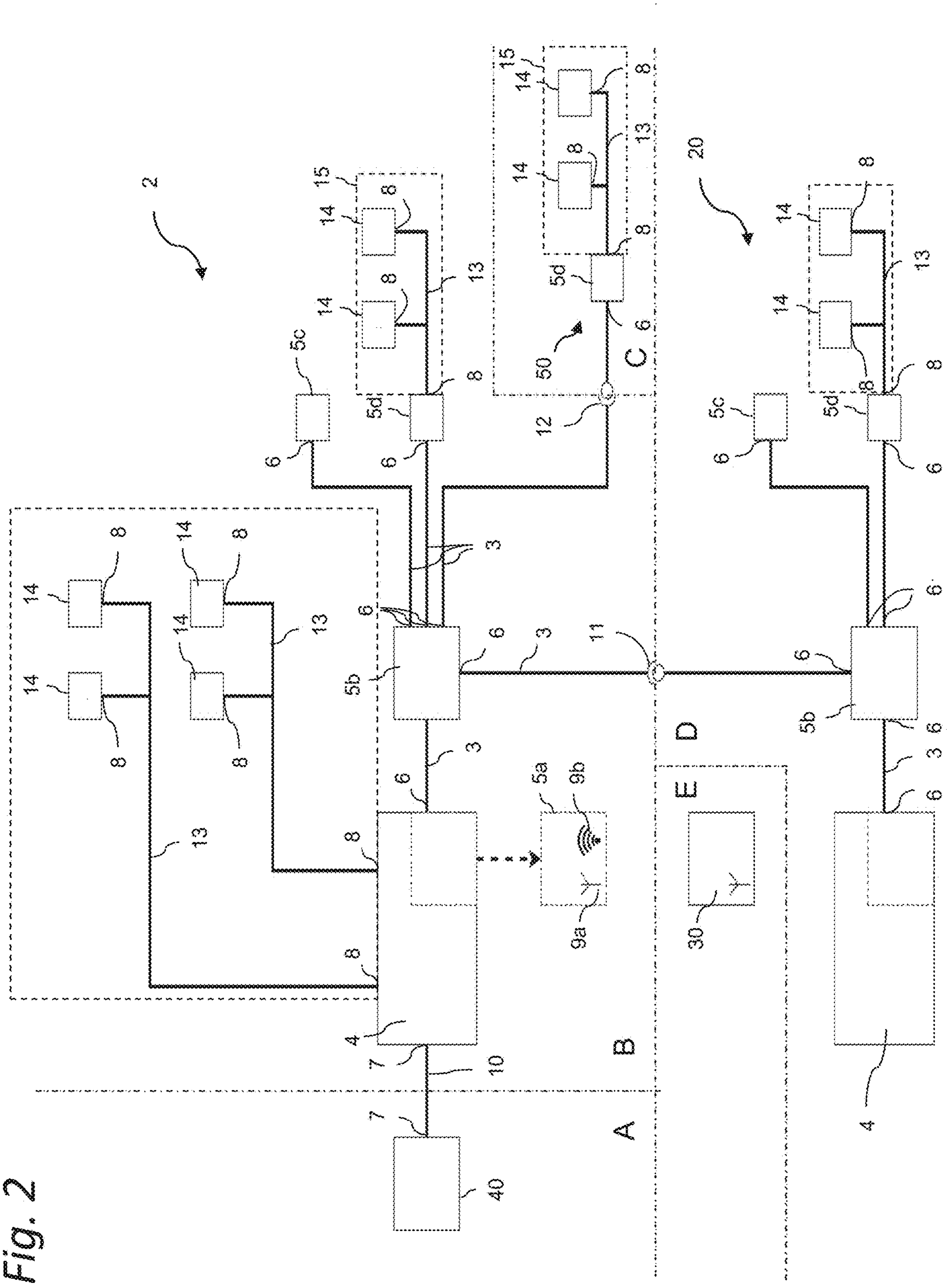
FIG. 2 a schematic representation of a communication system according to an embodiment of the invention.

FIG. 2 shows a schematic representation of a communication system 2 according to one embodiment of the invention.

FIG. 2 shows an example of five interconnected communication systems, which are described in more detail below. The system boundaries are each illustrated with semicolon lines, whereby the individual areas or individual communication systems are identified by the letters A to E.

For example, an agricultural machine 1 may be equipped with the communication system 2, shown in area B. The communication system 2 comprises an Ethernet data network 3, which may be, for example, a 100BASE-TX, 1000BASE-T, 100BASE-T1, or 1000BASE-T1 Ethernet. The communication system 2 further comprises a main control device 4, which is configured as a central computing and control unit for controlling machine functions, such as preferably the positionally accurate switching on and off of distribution and/or processing processes. The main control device 4 comprises several different data communication interfaces. These comprise at least one Ethernet interface 6 for connection to an Ethernet data network 3, a CAN interface 8 for connection to a CAN data bus 13 and an ISOBUS interface 7 for connection to an ISOBUS data bus 10. The main control device 4 may further comprise a LIN interface (not shown) for connection to a LIN bus.

The communication system 2 further comprises a plurality of auxiliary operation components 5, which have at least one Ethernet interface 6 and can perform different functions and are referenced by the reference signs 5*a* to 5*d* (instead of with the reference sign 5) depending on their function. The main control device 4 controls several of the connected auxiliary operating components 5 via the Ethernet data network 3. This control can be carried out according to the master-slave principle, whereby the main control device performs the function of the master and the auxiliary operating components perform the function of the slaves.

Both the main control device 4 and the auxiliary operating components 5 or 5*a* to 5*d* are thus connected to the Ethernet data network 3 and for this purpose each have at least one Ethernet interface 6 for connection to the Ethernet data network 3. The Ethernet interface 6 serves as a data communication interface for sending and/or receiving data via the Ethernet data network 3, e.g. for controlling machine functions.

The communication system 2 further comprises a plurality of second auxiliary operation components 14 which are either in direct communication with the main control device 4 via a CAN data network 13 or in communication with one of the auxiliary operation components 5*d* having both an Ethernet interface 6 and a CAN interface 8 via a CAN data network 13. The second auxiliary operating components 14 do not have to have an Ethernet interface. Alternatively to the CAN interface 8, one or more of the second auxiliary operating components 14 may have a LIN interface.

In FIG. 2, the dashed lines show two such CAN data bus-based subsystems 15 comprising second auxiliary operating components 14 that are part of the communication system 2 (shown in area B). These can be conventional control units and/or job computers that have not yet been converted to the Ethernet standard and can thus be advantageously integrated into a new Ethernet system architecture.

The main control device 4 is a computer on which Unix or a Unix derivative is installed as the operating system, preferably Linux. The auxiliary operating components 5 and the second auxiliary operating components 14 can perform their function or operating function depending on control data from the main control device 4 or can also perform their function independently in some cases. The main control device 4 thus serves as the central control of the working operation of the agricultural machine and controls at least some of the auxiliary operation components 5 and the second auxiliary operation components 14 for this purpose. The main control device thus serves in this case as a "high-performance computer" that can control various auxiliary operating components and could in principle also be installed on a commercially available high-performance PC based on Linux.

As already mentioned above, the main control device 4 has further data communication interfaces in addition to the Ethernet interfaces. In the embodiment shown in FIG. 2, this is an ISOBUS interface 7, via which ISOBUS-compatible components can be connected. An ISOBUS-based communication system 40 (shown in area A of FIG. 2) of another agricultural vehicle, e.g. a tractor, is connected via the ISOBUS interface 7. If, for example, the communication system 2 is installed in an agricultural machine that is towed by another agricultural machine, such as a tractor, the Ethernet-based communication system 2 can be connected via the ISOBUS interface 7 to an ISOBUS data bus 10 and via this to the operating terminal (VT) of the tractor.

The communication system 2 further comprises a mobile radio interface 9*a* and a wireless short-range connection interface, for example a WLAN interface 9*b*. The wireless interfaces 9*a* and 9*b* are here not integrated into the main control device 4, which is however alternatively possible, but are provided by an auxiliary operation component 5*a*. The wireless interfaces 9*a*, 9*b* are thus provided remotely in the dedicated auxiliary operation component 5*a*, wherein the auxiliary operation component 5*a* is in communication with the main control device 4, e.g. via an Ethernet connection or also wirelessly (shown by the dashed arrow). Preferably, all wireless data traffic of the communication system 2 with external units is realized via the wireless interfaces 9*a* and 9*b*.

For example, an external wireless component 30, such as a tablet computer, can be connected, which is shown in sub-area E of FIG. 2.

Reference sign 5*b* denotes another auxiliary operation component 5*b* of the communication system 2 which functions as a network distributor of the Ethernet data network 3 formed by an auxiliary operation component 5*b* or integrated into the main control device. Reference signs 5*c* and 5*d* denote auxiliary operation components formed as input and output modules, so-called I/O modules. Such I/O modules have one or more different communication interfaces. In addition, an I/O module typically has analogue and digital inputs and outputs, e.g. inputs for connecting sensors and outputs for connecting actuators that are to be controlled for the agricultural work processes. The second auxiliary operating components 14 are also such CAN-based I/O modules.

Compared to conventional job computers, the main control device 4 is thus characterized by the fact that in particular no sensors, actuators or the like are connected directly to the main control device 4. Instead, this is done at separate network nodes, the auxiliary operating components 5*c*, 5*d* or the second auxiliary operating components 14. Alternatively or additionally, it is also possible that one or more of the second auxiliary operating components 14 is itself configured as a network-capable sensor and/or actuator and is in communication connection with the main control device 4. The auxiliary operating components 5*d* differ from the auxiliary operating components 5*c* in that they have a CAN interface 8 to which second auxiliary operating components are connected.

One or more of the auxiliary operating components 5 or 5*c* or 5*d* or the second auxiliary operating component 14 can be configured to provide a safety function in terms of functional safety. These components can, for example, detect the presence of a safety-critical situation, e.g. on the basis of certain sensor values, and, in the presence of a safety-critical situation, and transfer, as part of a priority control mechanism, the control of the agricultural machine or of at least one actuator of the agricultural machine, which executes a safety-relevant movement in terms of functional safety, to a safe operating state in terms of functional safety.

Based on the system architecture of the communication system 2 as described in FIG. 2, further systems can be flexibly connected. For example, a communication system 50 of a non-independently operable agricultural machine can be connected to the communication system 2, see section C of FIG. 2.

The communication system 50 does not contain a main control device of its own, but only an auxiliary operating component 5*d* with an Ethernet interface 6 for connection to the communication system 2 and a CAN interface 8, to which in turn a subsystem of several second auxiliary operating components 14 with CAN interfaces 8 of the communication system 50 are connected. The communication system 2 has an interface 12 which can be provided, for example in the form of a socket, for connecting the communication system 50 of the non-self-contained agricultural machine so that the non-self-contained agricultural machine or its auxiliary operating components can be controlled by the main control device 4 via the connected communication system 50.

A further interface 11 can be used, for example, to connect an agricultural machine that can in principle also be operated independently or its communication system 20, shown in sub-area D of FIG. 2, to the Ethernet data network 3 and the communication system 2. The communication system 20 of the third-party machine now also has a main control device 4, several auxiliary operating components 5 with Ethernet interfaces and several second auxiliary operating components 14 with CAN interface 8. Thus, two communication systems 2 and 20 according to the invention can be connected together, e.g. to exchange data between two agricultural machines and to coordinate joint work processes, for example.

It has been noted above that the auxiliary operating components 5 or part of the auxiliary operating components 5 may have a CAN interface 8 in addition to the Ethernet interface 6 (shown by the auxiliary operating components 5*d* in FIG. 2). Alternatively, or in addition to the CAN interface 8, the auxiliary operating components may have, for example, an ISOBUS interface or a LIN bus interface.

The main control device 4 can optionally be configured to centrally access all data communication interfaces 6, 7, 9*a*, 9*b* and 13 in the communication system 2 for tracing and/or logging and to provide the data collected via these for diagnostic purposes. Corresponding tracing or logging can be implemented using standardized program libraries for Unix or Linux systems.

The main control device 4 is equipped with a multi-processor core on the hardware side and/or with at least two separately programmable CPUs. To use the multiple processor cores, the main control device 4 has multiple processor kernels of different types, i.e., the functionality of the main control device 4 is divided into sub-functionalities, each of which is implemented on the software side in such a way that they are each executed by different processor cores on the hardware side. For example, the main control device 4 can have its own "safety kernel" that bundles safety functions of the agricultural machine, preferably safety functions in the sense of functional safety. Furthermore, a real-time kernel may be provided which executes time-critical functions. The real-time kernel may be implemented on a separate CPU with a real-time operating system (RTOS). The real-time kernel can be configured to control selected machine functions of the agricultural machine in real-time or substantially without latency. In a particularly advantageous embodiment, the safety kernel is implemented as a real-time kernel. This enables real-time execution of safety functions.

An Ethernet-based communication system 2 with a main control device 4 implemented on Unix or a Unix derivative also offers the advantage that, during the manufacture of the agricultural machines, the control software associated with the respective machine configuration, which is to be implemented on the hardware of the main control device 4, can be transferred to the main control device 4 by means of, for example, an interface from an enterprise resource planning, ERP, system or by means of a computer unit of a production line (e.g. belt end tool).

Figure 3:
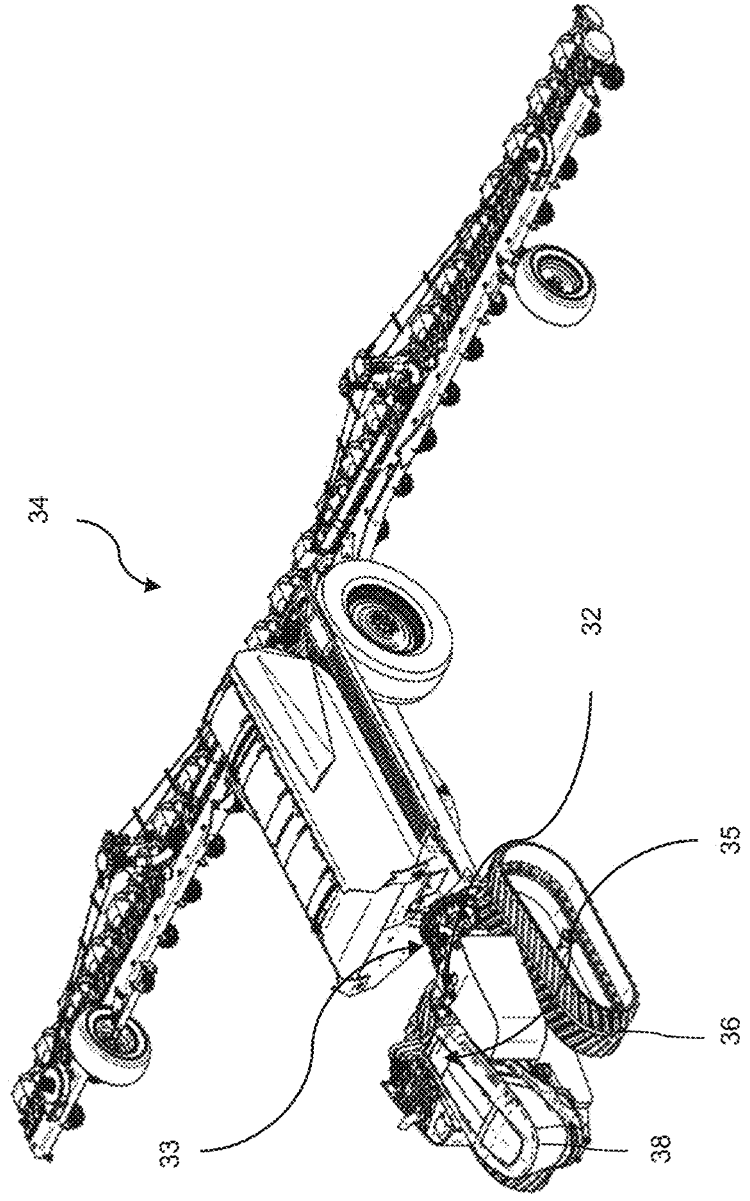
FIG. 3 a perspective view of an agricultural utility vehicle combination with a working implement in a working position according to an embodiment of the present disclosure.

FIG. 3 shows an agricultural utility vehicle combination 31. The agricultural utility vehicle combination 31 has an autonomously operable power head, e.g. an autonomously operable towing vehicle 32 and an implement 34 pulled by the towing vehicle 32. It is possible that the implement 34 can be uncoupled from the towing vehicle 32, e.g. for coupling another implement to the towing vehicle 32. The towing vehicle 32 is preferably configured without a driver's cab or driver's cabin. The towing vehicle 32 can be operated autonomously without a driver. The towing vehicle 32 can have locomotion elements or traction elements 36 and an environment detection sensor system 38.

The locomotion elements 16 can, for example, be configured as a track drive or caterpillar drive, as shown in the figures. For the sake of clarity, only the track or caterpillar track is shown in the figures without, for example, a drive wheel or idler wheel. The tractor 12 may have a drive train that drives the locomotion elements 16. The drive train may, for example, have an internal combustion engine, electric motor or diesel-electric drive. Other drive concepts are also conceivable.

The environment detection sensor system 18 is configured to determine or detect obstacles and/or elements present in the environment of the agricultural vehicle combination 10. The environment detection sensor system 18 can be configured in such a way that it can detect an environment in the direction of travel in front of and optionally next to the tractor unit 12. A detection of the environment can preferably take place over an entire working width of the implement 14. By means of the environment detection sensor system 18, obstacles such as trees, bushes, other plant obstacles and/or elements and the like can be detected, but preferably also living beings such as animals and/or humans.

The environment detection sensor system 38 may, for example, comprise a laser scanner and/or a camera system with, for example, a 3D thermal imaging camera. The environment detection sensor system 38 may alternatively or additionally comprise at least one 3D camera and/or at least one 3D scanner and/or at least one 3D rig. The environmental sensing sensor system 38 may alternatively or additionally comprise at least one infrared sensor. It is possible that the environment sensing sensor system 38 comprises at least two environment sensors. Preferably, the two environment sensors can be configured to detect different objects. For example, signals from both environment sensors can thus be evaluated by a control unit of the agricultural vehicle combination 31, e.g. as a composite or common image or generally in the form of an evaluation of a sensor fusion. Preferably, the two environment sensors can detect different physical properties, from which an evaluation is then made, for example, about a type of detected obstacle or element. The type can, for example, be evaluated in such a way that a statement can be made as to whether the detected obstacle or element is a living being (yes/no), an animal (yes/no), a human being (yes/no), etc. It is also possible for the evaluation of the type of obstacle or element to be carried out in such a way that a statement can be made as to whether the detected obstacle or element is a human being (yes/no). It is also possible that such an evaluation is already possible by means of a single environment sensor, e.g. with a 3D camera and corresponding image recognition algorithms. The implement 34 is articulated to the towing vehicle 32. The articulated connection comprises a joint 33. The articulated joint 33 may allow rotation about a vertical axis. The vertical axis may pass through the articulation 33. When the utility vehicle combination 31 is in a horizontal orientation, the vertical axis may be substantially perpendicular to a horizontal plane. The vertical axis may be substantially perpendicular to a longitudinal axis and to a transverse axis of the utility vehicle combination 31 (the towing vehicle 32 or implement 34). Preferably, the articulation 33 comprises a pivot joint, articulated joint and/or universal joint. For steering, the utility vehicle combination 31 has a steering actuator device. The steering actuator device may, for example, comprise at least one piston-cylinder unit. The steering actuator device can, for example, be operated electromagnetically, hydraulically or pneumatically. By means of the steering actuator device, a position of the joint 33 about its vertical axis can be adjustable for steering the utility vehicle combination 31. For example, the steering actuator device can be supported on the towing vehicle 32 on the one hand and on the implement 34 on the other hand. The utility vehicle combination 31 may have a position determining device 35. The position determining device 35 can continuously determine a current position or actual position of the utility vehicle combination 31. Preferably, the position determining device 35 is a GNSS (global navigation satellite system) position determining device, such as a GPS position determining device. The position determining device 35 may comprise one or more GNSS antennas, preferably GPS antennas. The at least one GNSS antenna may be arranged on the towing vehicle 32 (as shown), the implement 44 and/or the articulation 33. Preferably, the at least one GNSS antenna is arranged substantially centrally on the utility vehicle combination 31 with respect to a transverse axis of the utility vehicle combination 31.

The utility vehicle combination 31 further comprises a control unit (not shown). Preferably, the control unit is arranged in the towing vehicle 32. By means of the control unit, the utility vehicle combination 31 can be operated autonomously. For example, the control unit may be in communication with the drive, the braking device, the communication interface, the steering actuator device, and/or an actuator of the implement 34 for operating the utility vehicle combination 31, e.g. to receive information and/or issue control commands. The control unit may enable autonomous operation of the utility vehicle combination 31. For example, the control unit may operate the utility vehicle combination 31 in a first or autonomous operating mode.

The utility vehicle combination 31 may have a communication system 2 as described above. Here, the main control device 4 of the communication system 2 may be arranged exclusively on the towing vehicle 32 or the trailed implement 34. The auxiliary components 5 can be arranged on the towing vehicle 32 and/or functionally assigned to it and further comprise auxiliary components which are arranged on the trailed implement 34 and/or functionally assigned to it.

Alternatively, the agricultural vehicle combination 31 may comprise two communication systems 2, a first communication system being spatially and functionally associated with the towing vehicle 32 and a second communication system being spatially and functionally associated with the trailed implement 34.

The invention is not limited to the preferred embodiments described above. Rather, a large number of variants and variations are possible which also make use of the inventive concept and therefore fall within the scope of protection. In particular, the invention also claims protection for the subject-matter and the features of the dependent independently of the claims referred to.

The invention claimed is:

1. A communication system for an agricultural machine, comprising a main control device configured as a central computing and control unit to control a position-accurate switching on and off of distribution processes and/or processing processes of the agricultural machine; and at least one auxiliary operating component configured to perform an operating function assigned to it as a function of control data from the main control device, independently of the main control device, or as a function of control data from the main control device and independently thereof;

wherein the main control device and the at least one auxiliary operating component each have at least one Ethernet interface for connection to an Ethernet data network for sending and/or receiving data via the Ethernet data network during the control of the position-accurate switching on and off of distribution processes and/or processing processes, wherein the at least one auxiliary operating component comprises an auxiliary operating component coupled to the main control device in a master-slave configuration.

2. The communication system according to claim 1, wherein the main control device comprises at least one of the following data communication interfaces: a CAN data bus interface, an ISOBUS interface, a high-speed ISOBUS and a Local Interconnect Network (LIN) bus interface.

3. The communication system according to claim 1, further comprising a) a mobile radio interface, and/or b) at least one wireless short-range connection interface, wherein the mobile radio interface and/or the wireless short-range connection interface are integrated into the main control device or are provided by one of the at least one auxiliary operating component.

4. The communication system according to claim 1, wherein the main control device includes Unix or a Unix derivative installed as an operating system.

5. The communication system according to claim 1, wherein the main control device is programmatically configured to use multiple processor cores.

6. The communication system according to claim 5, wherein the main control device configured to use multiple processor cores comprises a first application kernel configured to control the machine functions;

and comprises at least one of the following kernels:

(a) a second application kernel configured to provide telematics functionality and/or diagnostics functionality of the agricultural machine;

(b) a safety kernel configured to, in the event of a safety-critical situation, override the control of the agricultural machine or at least one actuator of the agricultural machine by the first application kernel and is further configured to transfer the agricultural machine and/or the at least one actuator into a safe operating state; and (c) a real-time kernel adapted to control selected machine functions of the agricultural machine in real time, wherein the real-time kernel is implemented on a separate processor.

7. The communication system according to claim 6, wherein the safety kernel is implemented as a real-time kernel.

8. The communication system according to claim 1, wherein the main control device is configured to carry out a software update of an auxiliary operating component at a predetermined time and to transmit the software to be updated from the main control device to the auxiliary operating component via the Ethernet data network.

9. The communication system according to claim 1, wherein the main control device is configured to centrally access the data communication interfaces in the communication system for tracing and/or logging and to provide data acquired via the communication interfaces for diagnostic purposes.

10. The communication system according to claim 1, wherein the at least one auxiliary operation component comprises an auxiliary operation component configured as an input and output module comprising at least one input port for connecting a sensor and at least one output port for connecting an actuator.

11. The communication system according to claim 10, a) wherein all sensors and actuators of the agricultural machine are in communication with the main control device via one or more auxiliary operating components configured as input and output modules; and/or b) wherein the main control device is indirectly in communication connection with sensors and actuators of the agricultural machine via one or more auxiliary operating components configured as input and output modules; and/or c) wherein the main control device does not have analog inputs and analog outputs; and/or d) wherein actuation of an actuator and/or reading of sensor data of a sensor is carried out exclusively by one or more auxiliary operating components which are configured as input and output modules and which are configured to carry out the actuation and/or the reading of sensor data autonomously or in response to control commands generated by the main control device.

12. The communication system according to claim 1, wherein the master-slave configuration is configured such that the auxiliary operating component is configured to send data associated with its operating state to the main control device and to receive control signals from the main control device.

13. The communication system according to claim 1, wherein the at least one auxiliary operation component comprises an auxiliary operation component that is configured to:

a) perform a functional safety related safety function; and/or b) in the event of a safety-critical situation, transfer, as part of a priority control mechanism, control of the agricultural machine or of at least one actuator of the agricultural machine to a safe operating state in terms of functional safety.

14. The communication system according to claim 1, further comprising a network distributor of the Ethernet data network formed by an auxiliary operating component or integrated into the main control device.

15. The communication system according to claim 1, wherein the at least one auxiliary operation component comprises an auxiliary operation component comprising at least one of the following data communication interfaces, a CAN data bus interface, a LIN bus interface, and an ISOBUS interface.

16. The communication system according to claim 1, further comprising at least a second auxiliary operating component which comprises a CAN data bus interface and/or a LIN bus interface, which is, via a CAN data network and/or a LIN data network, in communication connection with the main operating component or with an auxiliary operating component having a CAN data bus interface or a LIN bus interface.

17. The communication system according to claim 1, wherein the communication system is configured to receive position information from a position determining device, and wherein the position determining device is configured to determine a current position of the agricultural machine.

18. The communication system according to claim 17, wherein a) the main control device is configured to control a position-accurate switching on and off of distribution processes and/or processing processes as a function of the received position information; and/or b) the at least one auxiliary operating component comprises an auxiliary operating component which is configured to control a positionally accurate switching on and off of distribution processes and/or processing processes as a function of the received position information.

19. The communication system according to claim 18, wherein the main control device and/or the auxiliary operating component are configured for controlling manual switching on and off of distribution processes and/or processing processes as a function of a user input and are in signal connection with an input device for capturing the user input.

20. The communication system according to claim 18, wherein the main control device and/or the auxiliary operating component for controlling the switching on and off of distribution processes and/or processing processes is configured to control spray nozzles for dispensing a liquid active substance and/or metering devices for dispensing a granular distribution material.

21. The communication system according to claim 1, further comprising a monitoring module which is part of the main control device or is in signal connection therewith and is configured to receive environment data from at least one camera for environment detection and/or from environment sensors and to process it for environment monitoring.

22. The communication system according to claim 21, wherein the monitoring module is implemented as an artificial intelligence module which is configured to evaluate the environment data for environment monitoring by machine learning methods and/or an artificial neural network.

23. An agricultural machine comprising a communication system according to claim 1, wherein the agricultural machine is one of: an agricultural spreader, a field sprayer, a pneumatic fertilizer spreader, and a seed drill.

24. The agricultural machine according to claim 23, wherein the agricultural machine is a towed implement configured for soil or crop treatment.

25. An agricultural vehicle-trailer combination comprising a towing vehicle configured as a tractor and the towed implement of claim 24, wherein the tractor has a communication system distinct from the towed implement.

26. An agricultural utility vehicle combination, comprising an autonomous towing vehicle and a towed implement according to claim 24 for agricultural soil or plant treatment, wherein the main control device of the communication system is arranged exclusively on the towing vehicle or the towed implement and the at least one auxiliary operating component comprises auxiliary operating components arranged on the towing vehicle and auxiliary operating components arranged on the towed implement, or wherein the agricultural utility vehicle combination comprises two communication systems wherein a first communication system is spatially and functionally associated with the towing vehicle and a second communication system is spatially and functionally associated with the towed implement.

27. A method of manufacturing an agricultural machine according to claim 23, comprising the steps of:

manufacturing an agricultural machine with a specific machine configuration, wherein control software for controlling the agricultural machine stored in an enterprise resource planning system or a computer of a production line for manufacturing the agricultural machine is selected and/or parameterized as a function of the specific machine configuration and is transferred from the enterprise resource planning system or the computer of the production line to the main control device.

28. The communication system of claim 1, wherein the machine functions that are controlled by the main control device include the positionally accurate switching on and off of distribution processes and/or processing processes.

* * * * *